March 27, 1934.  W. F. NEWHOUSE  1,952,215
HIGH SPEED STAPLING MECHANISM
Filed July 29, 1932  8 Sheets-Sheet 1
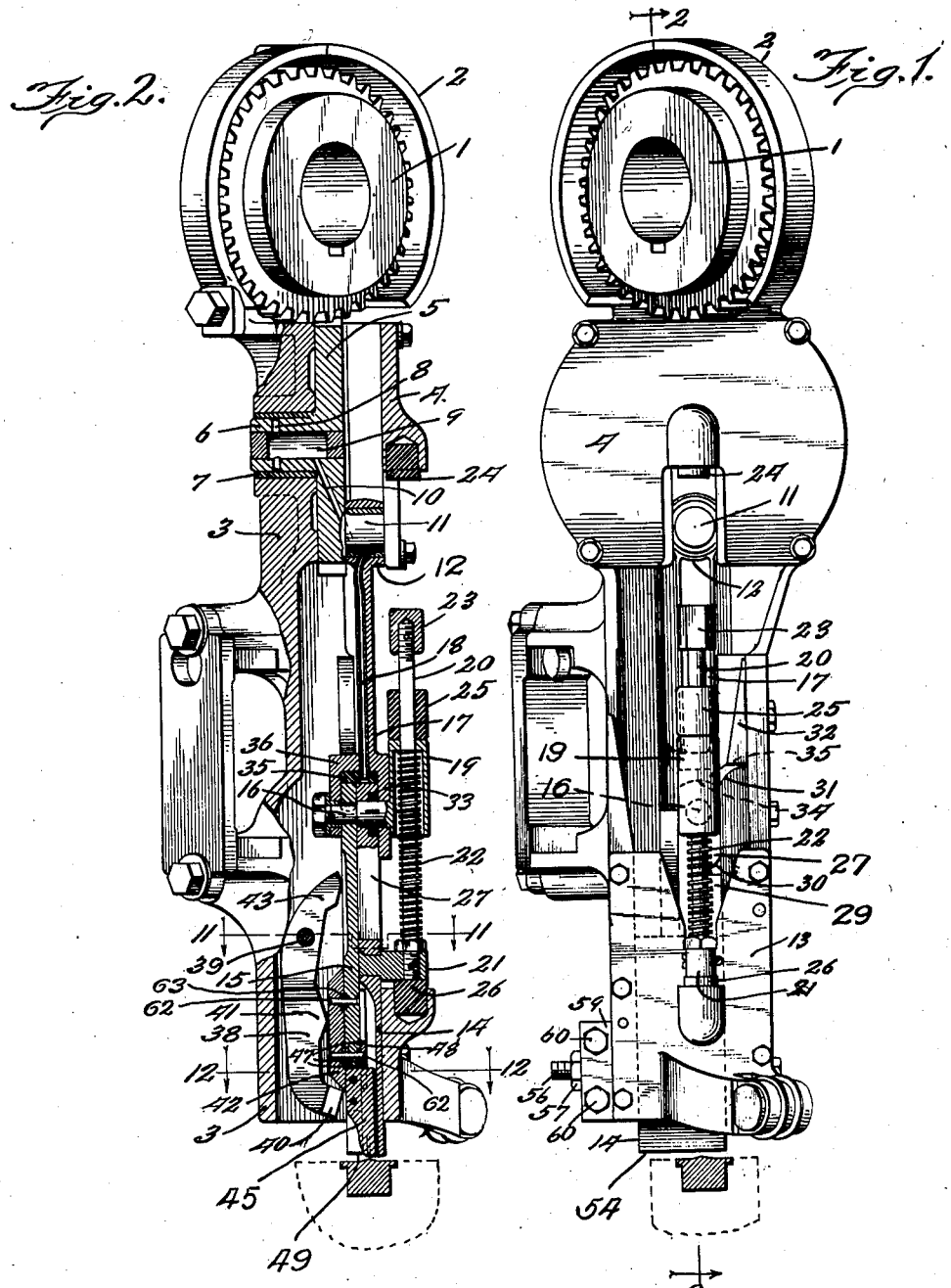

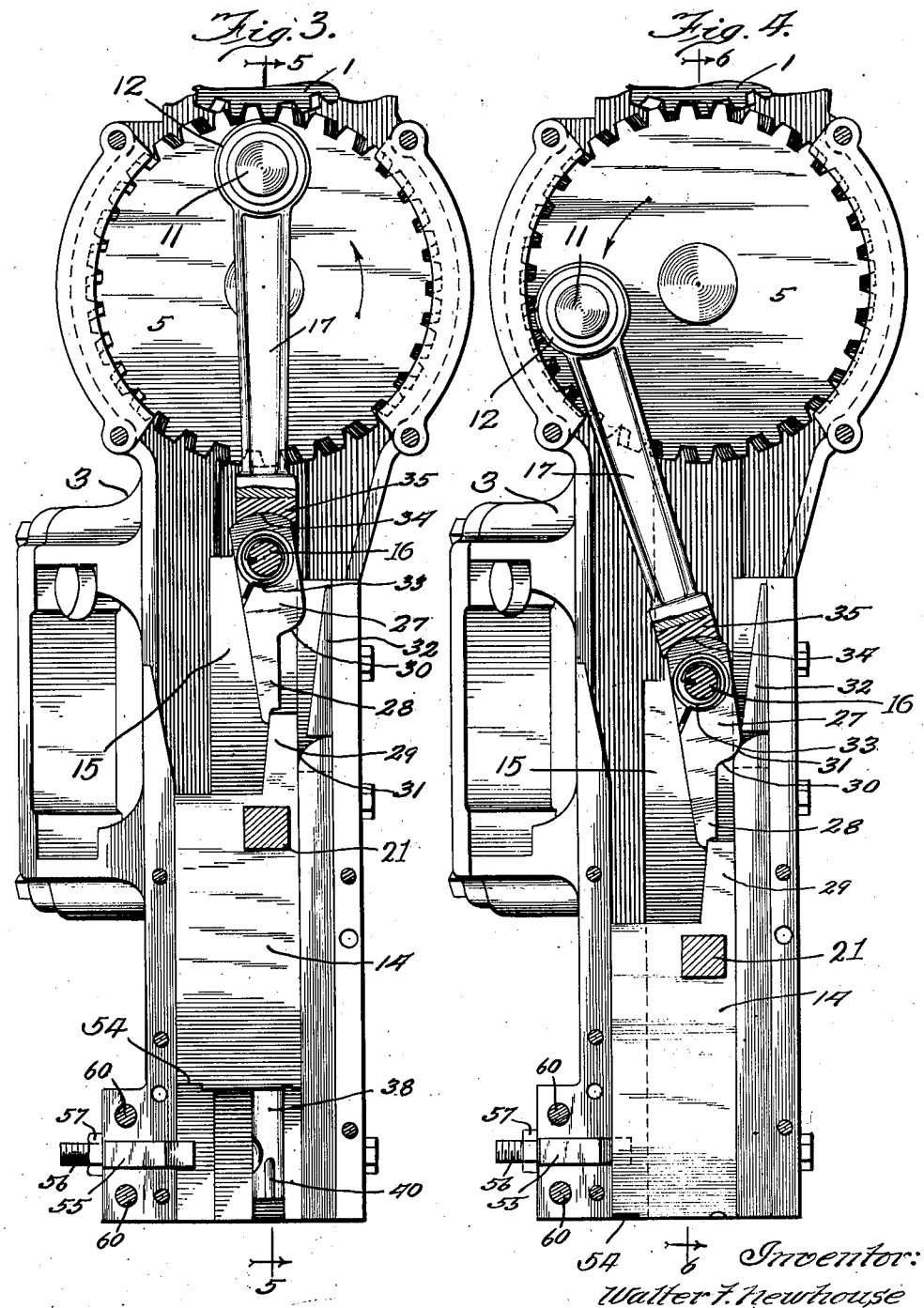

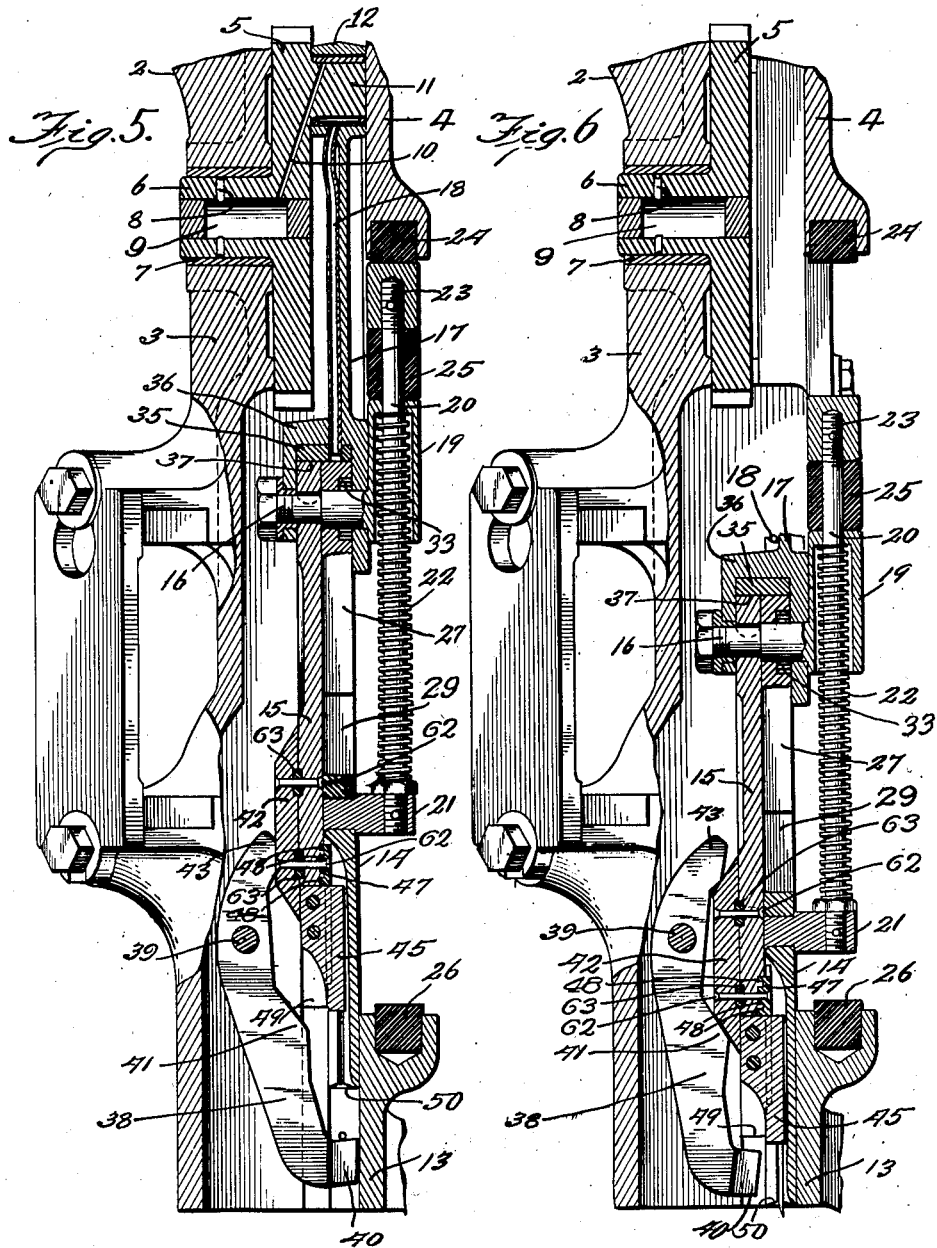

March 27, 1934. W. F. NEWHOUSE 1,952,215
HIGH SPEED STAPLING MECHANISM
Filed July 29, 1932 8 Sheets-Sheet 4

Inventor:
Walter F. Newhouse
By Arthur F. Durand
Atty.

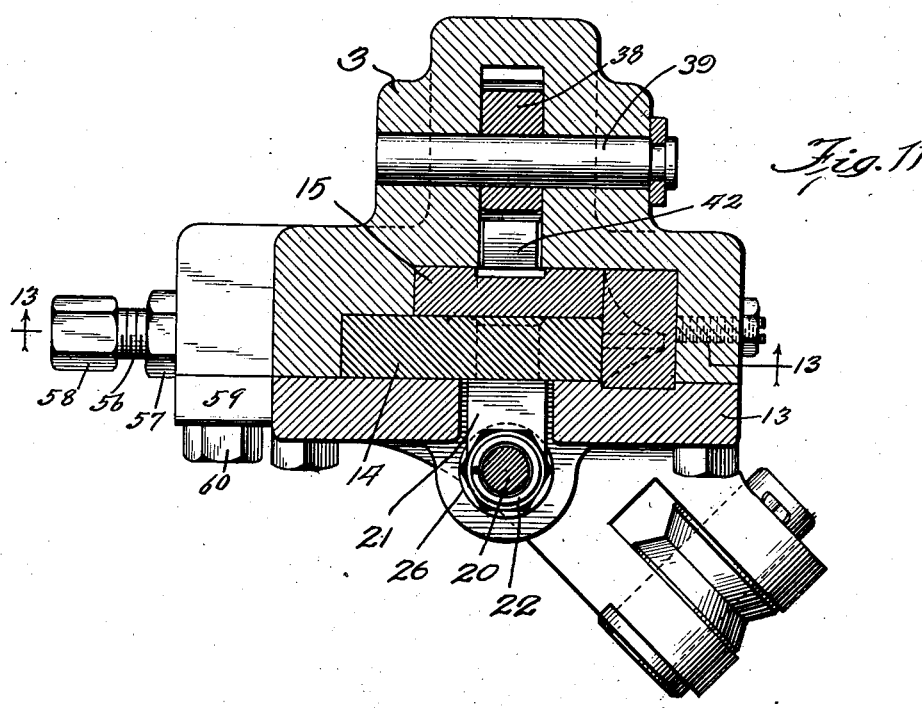
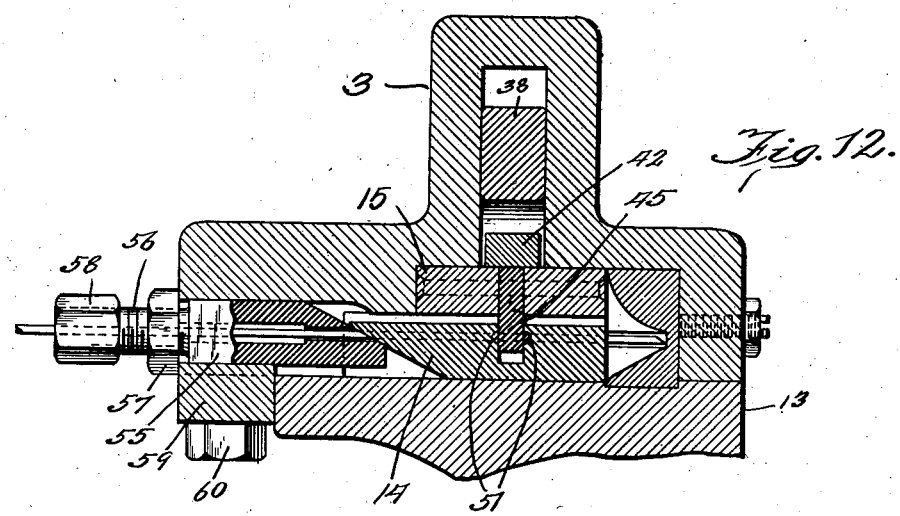

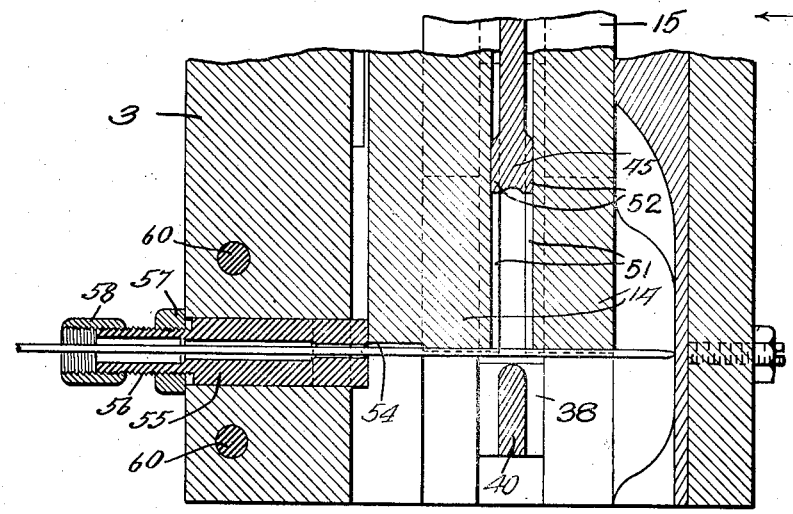
Fig.13.
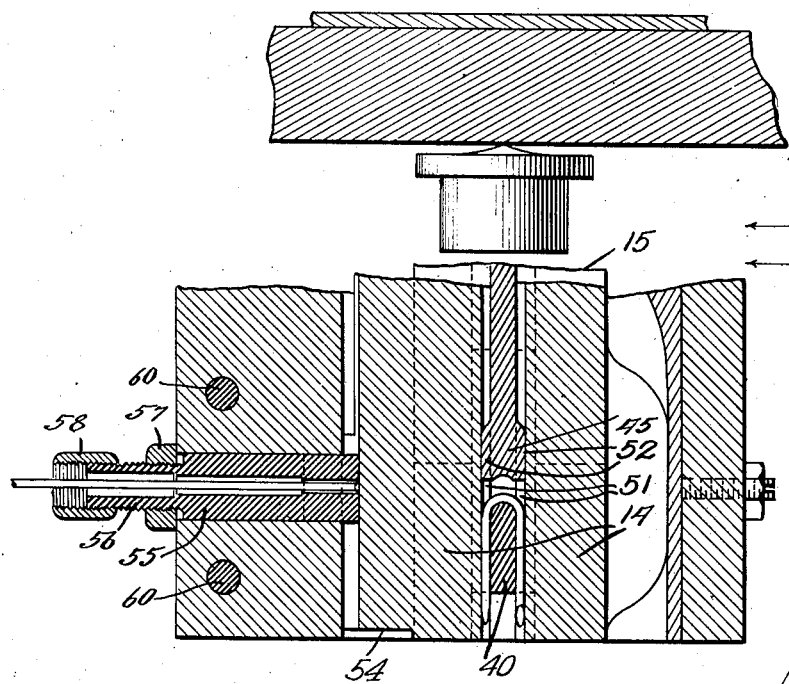
Fig.14.
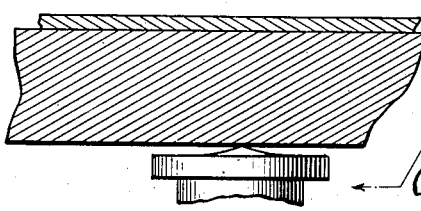

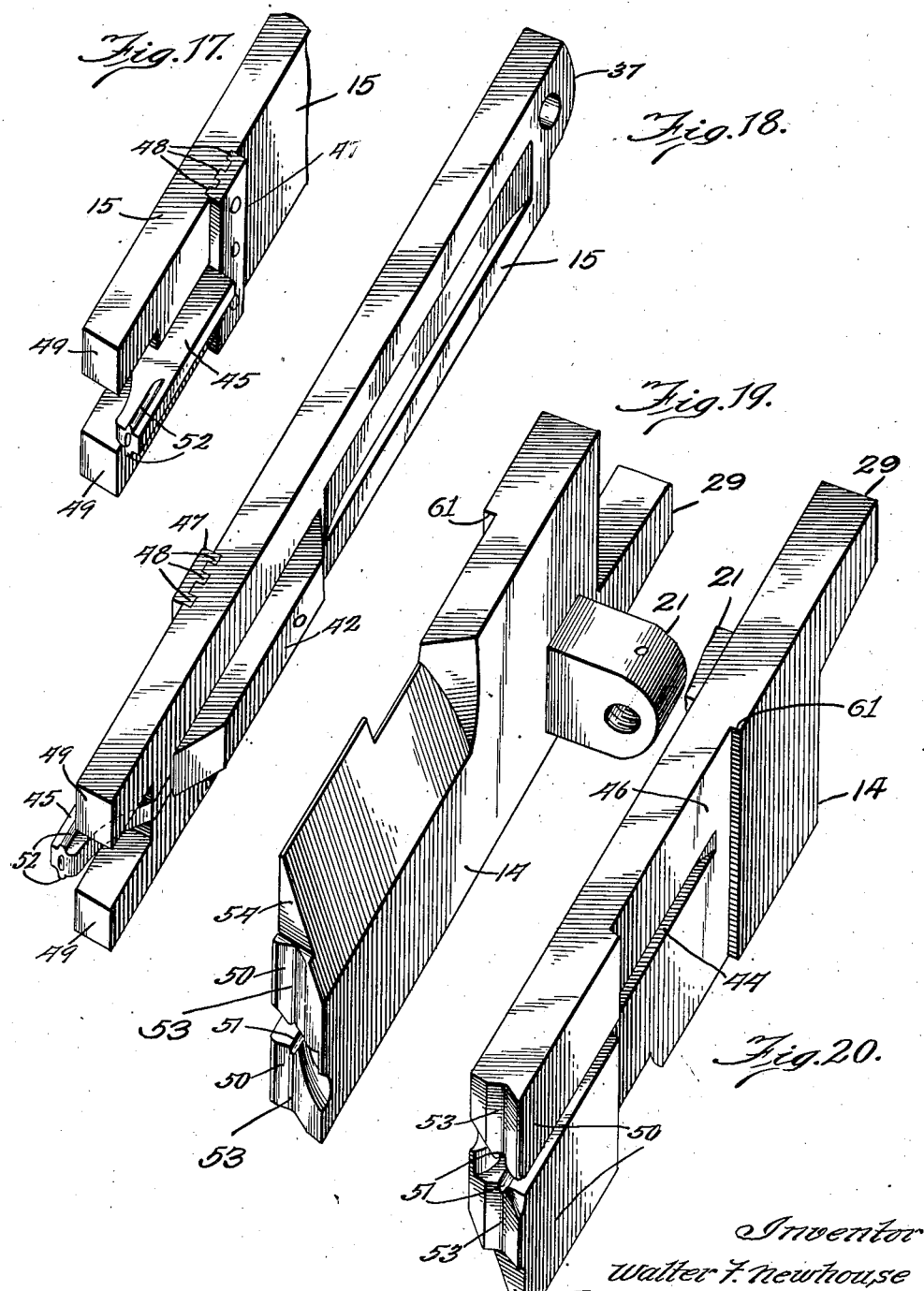

Patented Mar. 27, 1934

1,952,215

UNITED STATES PATENT OFFICE 1,952,215

HIGH SPEED STAPLING MECHANISM

Walter F. Newhouse, Benton Harbor, Mich.

Application July 29, 1932, Serial No. 625,868

22 Claims. (Cl. 1—2)

This invention relates to stapling machinery, and more particularly to the mechanism for forming and driving the staples.

Generally stated, the object of the invention is to provide a novel and improved construction and arrangement whereby a reciprocating stapling mechanism may be run at higher speed than has heretofore been possible with stapling mechanism of ordinary or known character.

Another object is to provide a novel and improved construction and arrangement involving bumpers or cushions, such as blocks of rubber, or other resilient means, disposed in advantageous and effective position to prevent or greatly reduce shocks and vibrations, during the rapid reciprocation of the mechanism, whereby not only to contribute to the high speed of the stapling mechanism, but also to reduce the wear and tear on the mechanism, and increase the endurance and lengthen the life thereof, and reduce noise.

It is also an object to provide certain details and features of construction and combinations tending to increase the general efficiency and the desirability of a high-speed reciprocating stapling mechanism of this particular character.

To these and other useful ends, the invention consists in the matters hereinafter set forth and claimed, and shown in the accompanying drawings, in which,—

Fig. 1 is a front elevation of a reciprocating stapling mechanism embodying the principles of the invention.

Fig. 2 is a vertical section on line 2—2 in Fig. 1 of the drawings.

Fig. 3 is a front view of said stapling mechanism, on a larger scale, with the front plate of the housing thereof removed, and with certain portions broken away, and other portions in section, for convenience of illustration.

Fig. 4 is a view similar to Fig. 3, showing the parts in different positions.

Fig. 5 is a vertical section on line 5—5 in Fig. 3 of the drawings.

Fig. 6 is a vertical section on line 6—6 in Fig. 4 of the drawings.

Fig. 11 is an enlarged horizontal section on line 11—11 in Fig. 2 of the drawings.

Fig. 12 is a similar section on line 12—12 in Fig. 2 of the drawings.

Fig. 13 is a vertical section on line 13—13 in Fig. 11, with the parts shown in certain positions.

Fig. 14 is a similar section, showing the parts in different positions.

Figs. 17, 18, 19 and 20 are perspective views of certain elements or parts of said mechanism.

Figure 7:
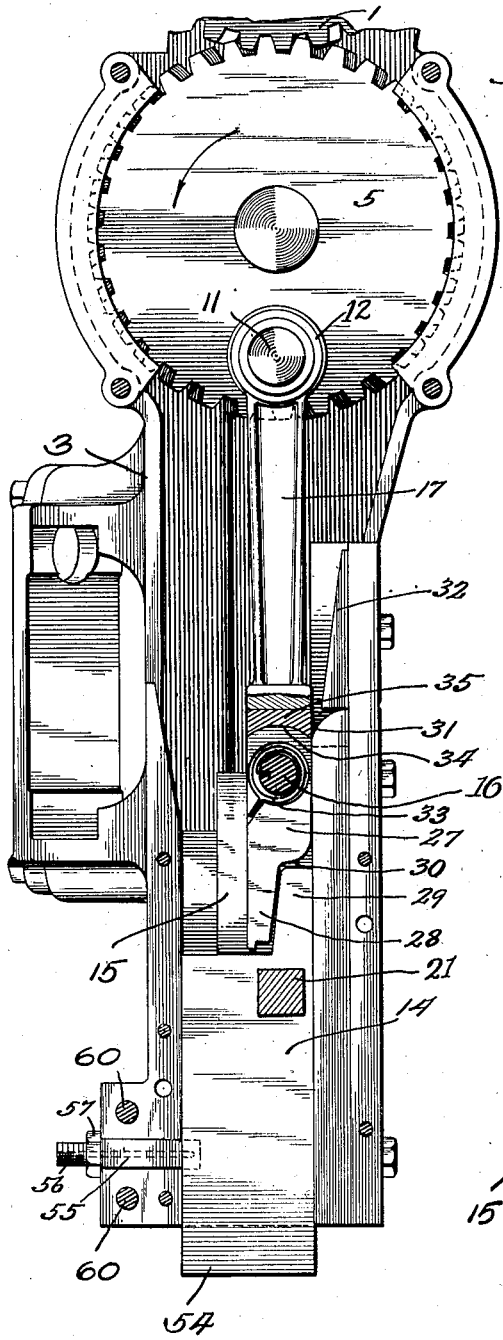
Fig. 7 is a view similar to Figs. 3 and 4, showing the parts in different positions.

As thus illustrated, the invention comprises a helical pinion 1 mounted, in practice, on an overhead shaft (not shown) of the machine upon which the stapling mechanism is employed. This helical pinion is preferably enclosed by a housing 2 of any suitable character, and this housing has a rigid depending body 3 upon which the various elements of the mechanism are supported, said housing and its depending body being supported in any suitable or desired manner. It will be seen that the said body has a front plate 4, which is removable, and this front plate and the body are in a vertical plane disposed at an angle to the vertical plane of the said helical pinion. A helical gear 5 is provided with an integral hub portion 6, on its rear side, which hub portion is mounted in a suitable bearing 7 formed in said body, said hub being preferably hollow, as shown, and provided with radial oil ducts 8 leading to the hollow bore 9 of the gear, which bore in turn connects with an oil duct 10 leading to the crank-pin bearing 11 on the face of said helical gear. In this way, when the pinion 1 is forcibly rotated, the gear 5 is rotated about its horizontal axis, and the crank pin 11 is revolved in a circle behind the front plate 4, a pitman head 12 being mounted on said crank pin 11, and being lubricated by oil from the bore 9 of the helical gear. The head 12 is held on the crank 11 by the inner side of the removable plate 4, as shown in Fig. 2 of the drawings.

The lower portion of the body 3 has a front plate 13 which is removable, and behind which are the staple former 14 and the staple driver 15, the latter having its upper portion provided with a pivot bolt 16, to which is connected the lower edge of the pitman 17, which latter has its upper end connected with the pitman head 12 previously mentioned. The bearing formed by the pivot bolt 16 is lubricated by oil communicated thereto through the duct 18 which leads from the crank-pin bearing 11 previously mentioned. Said pivot bolt 16 has its outer end provided with an integral bearing 19, and a rod 20 slides up and down in this bearing, said rod having its lower end secured to a bracket 21 suitably secured to the said staple former 14, as shown. A coiled spring 22 is interposed between the guide bearing 19 and the bracket 21, on the rod 20, and the upper end of the latter is provided with a head 23, as shown. A bumper 24 is fixed on the plate 4, in position to be engaged by the head 23 when the latter rises, and a bumper 25 is mounted on the rod 20, between the guide bearing 19 and the head 23, the bumper 25 being slidable on said rod. A similar bumper 26 is mounted on the lower front plate 13 in position to be engaged by the bracket 21 when the latter moves downward. A dog 27 is pivoted on the bolt 16 and has an end portion 28 for engagement with the upper end portion 29 of the staple former, and this dog 27 has a cam portion 30 for engagement with the stationary cam 31 mounted within the casing of the mechanism, there being a wedge-shaped member 32 which guides the said dog, by engagement with the cam 30, during the downward stroke of the mechanism, thereby to at the right time release the staple former 14 from the staple driver, permitting the latter to then move downward alone, after the staple former strikes the work into which the staple is to be driven. It will be seen that the upper end of the dog 27, which is controlled by a spring 33, has a rounded portion 34 which is formed as an arc struck from the center of the pivot bolt 16 and which engages a sector bearing 35 suitably fixed in the lower head 36 of the pitman 17, so that the downward thrust of the mechanism is not entirely sustained by the pivot bolt 16, but is sustained by the curved surface of the sector bearing 35, as the latter communicates downward pressure to the dog 27, and the latter communicates the downward pressure to the staple former, until the latter is released by disengagement of the dog therefrom.

It will be understood, of course, that all of said bumpers may be of rubber or other suitable resilient material.

It will be seen that the upper end of the staple driver 15 is rounded at 37, on an arc struck from the center of the pivot bolt 16, to also engage the sector bearing 35, it being observed, as shown in Fig. 2, that the joint between the bolt 16 and the staple driver is a little loose, whereby the downward thrust from the pitman 17 to the staple driver and former is sustained by the sector bearing 35, thereby eliminating or greatly reducing the shearing strain on the pivot bolt 16, by which the pitman 17 is connected from the crank plate formed by the gear 5 to the staple former and driver.

For the formation of the staple, the staple driver and former are adapted to co-operate with the pivoted loop bar 38, which is pivoted at 39 on the casing or body 3 of the stapling mechanism, and which has its lower end portion 40 adapted to support the wire while the latter is being bent into staple form by the staple former. The middle portion of the loop bar 38 has a cam 41 adapted to be engaged by the cam strip 42 on the back of the staple driver, thereby to throw the portion 40 back out of engagement with the staple head, after the staple is formed, and out of the path of the staple driver, so that the latter will be free to insert the staple in the work. Upon the up stroke the cam 42 will engage the cam portion 43 on the upper end of the loop bar, and hold the portion 40 in normal position to receive and support the wire upon the next down stroke of the mechanism.

The staple former 14 has one side provided with a slot 44 forming a guide for the lower end portion 45 of the staple driver, and has a flat recess 46 in which the cross bar 47 slides up and down, this bar having its face provided with parallel ribs 48 engaging similar channels in the staple driver, which bar 47 bears upon the upper end portion of the portion 45, which latter is removably fastened in place between the side portions 49 of the staple driver. The bar 47 is secured by rivets to the staple driver 15, but the ribs 48 take the shearing strain off from said rivets, so that during the insertion of the staples the thrust is not on said rivets, but is on said ribs 48, in a manner that will be readily understood. It is the portion 45, it will be understood, that engages the top of the staple and inserts the latter in the work, the portion 45 being formed to slide between the two prongs or side portions 50 of the staple former, the latter having grooves 51 that serve as guides for the legs of the staple, and for the ribs 52 of the staple driver. The staple former 14 has grooves 53 on the bottom of its two end portions, for engagement with the straight length of wire, as the latter is fed across the path of the staple former, and has the knife edge 54 that co-operates with the feed tube 55 to cut off the length of wire, obliquely, to provide oblique or sharp ends for the staples, beveled in a manner to cause the staples to be deflected in the work in the desired manner.

Figure 8:
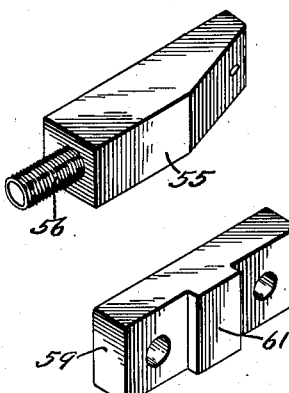
Figs. 8, 9 and 10 are enlarged perspectives of different parts or elements of the said mechanism.
Figure 9:
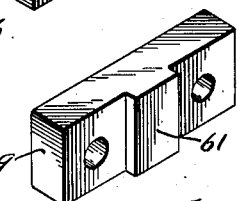
Figure 10:
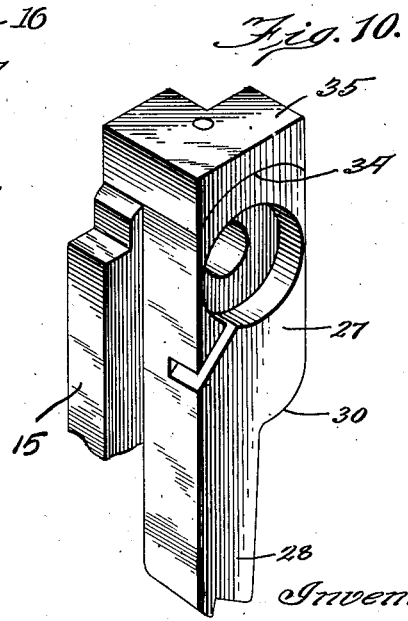
Figure 15:
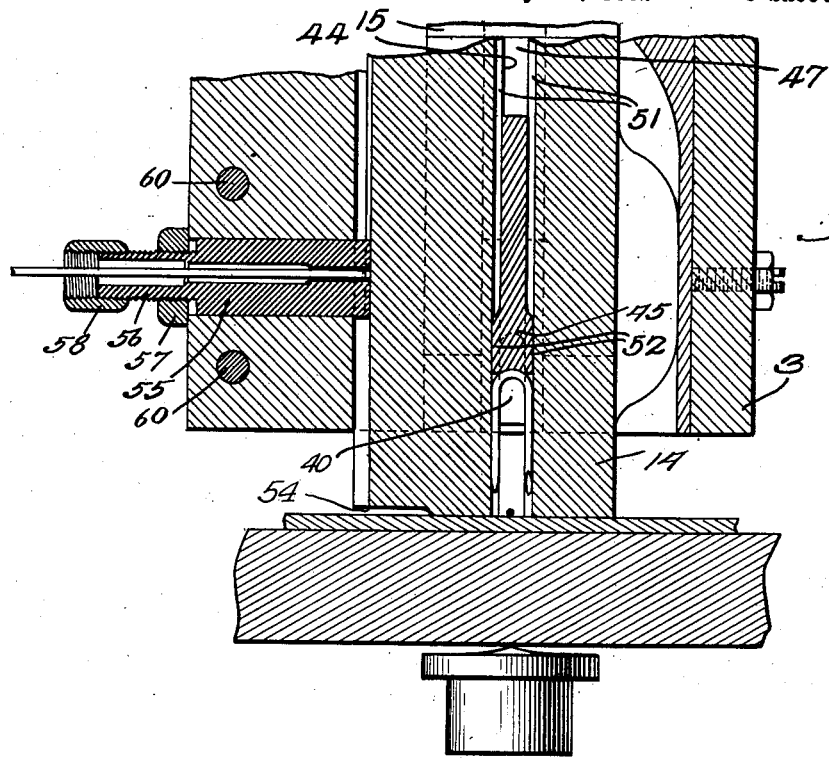
Fig. 15 is a similar section, showing the parts in different positions.
Figure 16:
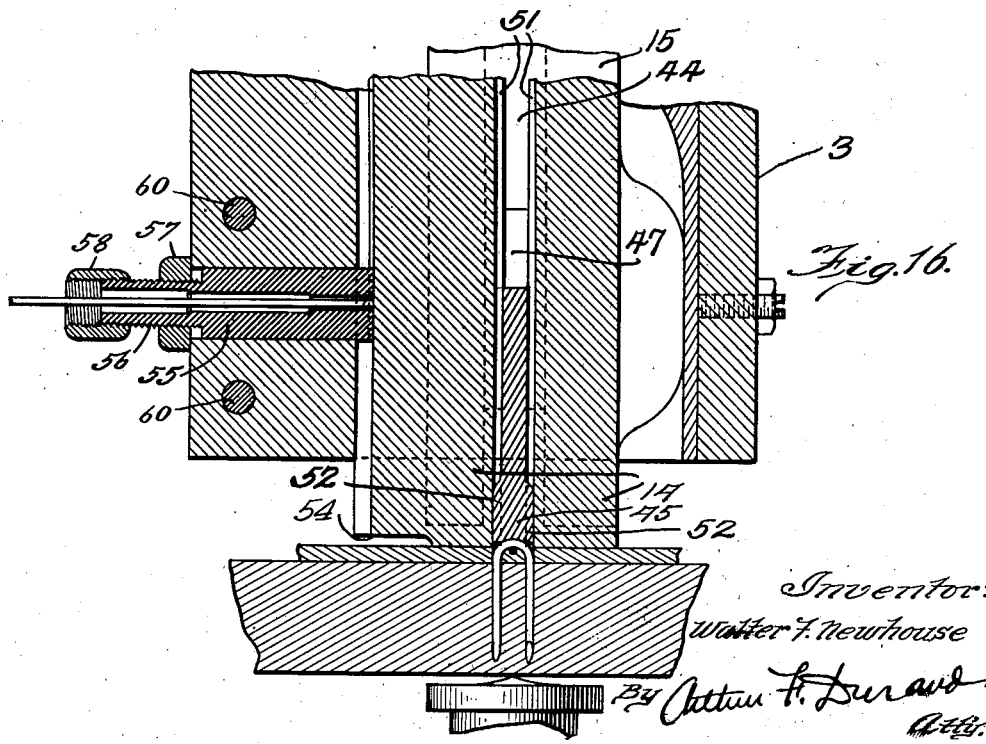
Fig. 16 is a similar section, showing the parts in different positions.

Referring to Fig. 13, it will be seen that the cutter edges operate to sever the wire just a little after the engagement of the grooves 53 with the top of the horizontal wire, as the edge 54 is in a plane above the grooves 53, whereby the latter is pressed down slightly and into engagement with the loop bar portion 40 at about the time of or just before the cutting off of the wire. It will be seen that the feed tube 55 is preferably square, or rectangular, in cross section, as shown in Fig. 8 of the drawings, and that it has a threaded shank portion 56 for engagement with the nuts 57 and 58, a detachable block 59 is held in place by removable bolts 60, this block having a middle portion 61 for engagement with the feed tube 55, whereby to clamp the latter in accurately adjusted position to co-operate with the cutting edge of the staple former, in the desired manner. The cam 42 is preferably riveted to the staple driver 15, as shown, or in any suitable or desired manner.

In operation, the rotation of the pinion 1 causes rotation of the gear 5, and thereby causes vertical reciprocation of the staple former and the staple driver. When the staple former 14 and the staple driver 15 start downward together, being locked together by the dog 27, the downward motion continues until the dog is disengaged from the staple former, by the cam 31, at which time the lower end of the staple former has engaged the work, and the compression of the spring 22 serves to permit relative movement between the staple former and the staple driver, and serves to yieldingly hold the staple former down against the work. The staple driver 15 then continues downwardly alone, thrusting the loop bar 38 out of the way, and inserting the staple into the work in the required manner. The mechanism is adapted to run at high speed, and during such high speed the reciprocation is cushioned by the bumpers 24, 25, 26, by engagement therewith of the parts previously described, whereby shock and strain are minimized or greatly reduced, and noisy pounding is also prevented. The up stroke is cushioned by the bumper 24 and by the bumper 25, as shown in Fig. 5, so that the up thrust at the time of the reversal of movement is not on the bar 47, or not entirely so, and if no material to be stapled is directly under the former 14 at the extreme downward stroke, the bracket 21 will strike the bumper 26, thereby delaying said bracket and causing the staple driver to expel the preformed staple from the former, thus relieving strain and possibly breakage of the bracket 21, at the end of the down stroke, by means of the bumper 26, whereby a cushioning action is obtained at various points to reduce shock and strain and to prevent or greatly reduce the audible pounding of the reciprocating stapling mechanism. The sector bearing 35 must be of non-resilient metal, thereby taking the shearing strain off the pivot bolt 16, as previously explained. The cushion 25 functions to resiliently limit the up stroke of the staple driver relatively to the staple former, before the head 23 engages the cushion 24, as illustrated in Figs. 5 and 6 of the drawings.

With the construction shown and described, therefore, a high speed is attainable, higher than was possible with stapling machines heretofore employed of this general character. For example, with stapling mechanism of the construction shown and described, a speed of from 250 to 450 revolutions per minute of the shaft upon which the pinion 1 is mounted, is possible and practicable, in connection with the manufacture of box blanks or crate blanks, or other products, and particularly in situations where it is possible to have the materials pass continuously at comparatively high speed below the stapling mechanism, in order to increase the output of the machine and thereby reduce the cost of production.

It will be seen that the pinion 1 and the gear 5 are in different vertical planes, whereby the stapling mechanism is skewed relatively to the axis of the pinion 1. However, as stated, the pinion and gear have helically formed teeth, whereby the pinion drives the gear in the desired manner. With this arrangement, it will be seen that the weight is practically reduced to a minimum, whereby high speed reciprocation of the stapling mechanism is possible, and more practicable than would be the case with stapling mechanism of the ordinary kind, in which the weight of the different parts is considerable, for when the weight is great the reversal of the motion for each stroke of the mechanism is more difficult, of course, owing to the momentum of the heavy parts. However, with the construction shown and described, the weight and momentum are reduced practically to a minimum, so that the mechanism may be run at high speed without danger of breakage, and without injurious shocks and vibrations.

It will also be seen that the pinion 1 could be a spur gear, and that the crank gear 5 could be a helical gear, of any suitable character, which would have the advantage of affording any desired staple angle without changing the gear 1, and there could be spur teeth on both gears 1 and 5, and in such case their axes would be parallel. Therefore, it will be understood that the construction in this respect may be changed or varied, according to requirements, without departing from the spirit of the invention.

In addition, it will be seen that the important cushioning effect at high speed occurs at the element 25, and that this is for the staple former only, since while driving the staple the staple former must come to a complete stop. Upon the return stroke of the staple driver, the staple former must be brought from its stationary position to the full motion of the staple driver, practically instantly. At comparatively low speeds, this presents no serious difficulties, but at high speed the impact is sufficient to result in breakage of the parts, if there are no provisions to the contrary. Therefore, the bumper 25 absorbs the impact, when it comes in contact with the head 23, and while the bar 47 is intended primarily to reinforce the staple driver portion 45, it is also true that it serves to insure the return of the staple former 14, should the said bumper means become inactive. Since the relative dimensions between the staple former 14 and the staple driver 15 are governed by the bumper 25, they may be said to be somewhat indefinite, and without sufficient clearance the dog portion 28 might fail to engage the staple former 29, and hence the bumper 24 serves to limit the movement of the staple former on the up stroke. Also, the bumper 26 limits the movement of the staple former on the down stroke, only when no material is in position to be stapled.

Furthermore, it will be seen that the element 32 is in the nature of a safety device, whereby should portion 28 break, it will not strike on the upper end of the cam 31, thereby avoiding serious breakage of some of the parts of the mechanism.

Obviously, also, the staple former 14 and the feed tube 55 may have their cutting surfaces so relatively positioned as to cause the wire to be severed at right angles, if such is desirable.

As a matter of further and special improvement, it will be seen that the rivets 62 that hold the staple driver 15 and the cam 42 together have bushings 63 thereon, in the plane of the joint between the staple driver and the said cam, whereby the shearing strain is not on the rivets, but on the bushings instead. The heads of the rivets are countersunk in the staple driver and cam, and in this way much strain on the rivets is eliminated.

As a matter of further and special improvement, in addition to the advantages heretofore explained, it will be seen that the spring 22 serves to insure such a relation between the staple driver 15 and the staple former 14, that it practically insures the proper engagement of the dog 27 upon the up stroke of the former and driver.

As another special improvement, it will be seen that the pin 16 is not only a wrist pin, for the connection of the driver 15 with the pitman 17, but is also the latch pin or pivot for the latch or dog 27, as clearly shown in Figs. 3, 4, 5, and 6 of the drawings.

A further improvement, it will be seen, consists of the flat coil spring, like a clock spring, shown at 33 in the drawings. It will be seen that this spring is disposed in a recess formed in the latch 27, around the wrist pin 16, with one end of said spring anchored in the wrist pin, and the other end anchored in the latch, as more clearly shown in Figs. 3 and 4 of the drawings. In this way, the parts are all snugly assembled around the wrist pin, those that engage the latter, and a very compact and strong combination wrist pin and latch construction is provided, one that will stand high speed and long service without danger of breakage or impairment thereof.

From the foregoing it will be seen that the gear wheel 5 is supported entirely at its rear side, leaving its front side clear and flush for the movement of the connection to the stapler. Also, it will be seen that the staple former is so shaped that the wire is bent slightly downwardly, at the inner end of the tube cutter 55, before it is cut off at 54, and before it is bent into staple form.

What I claim as my invention is:

1. In stapling mechanism, the combination of reciprocating staple forming and driving means, a gear wheel provided on the front side thereof with a crank having a connection for operating said staple forming and driving means, means whereby said gear wheel is supported entirely at its rear side, leaving the front side clear for said connection, a removable housing plate holding said crank connection in place, and a pinion for engaging and rotating said gear wheel.

2. A structure as specified in claim 1, said gear wheel and pinion being skewed relatively to each other, so that they are disposed in different vertical planes, one plane being at an angle to the other, and the teeth of said gear wheel and pinion being helically formed.

3. A structure as specified in claim 1, said crank connection comprising a pitman having one end cranked directly on the gear wheel and having its other end pivoted on the staple driving means.

4. In stapling mechanism, the combination of reciprocating staple forming and driving means, means including a gear wheel forming a crank, a pitman connecting said crank with said staple driving means, a removable stationary plate holding said pitman and crank in place, and means for rotating said crank.

5. In stapling mechanism, the combination of reciprocating staple forming and driving means, actuating means operative to reciprocate said staple forming and driving means, and means including stationary stops forming resilient cushioning means to cushion the strokes of said staple forming means.

6. A structure as specified in claim 5, said cushioning means comprising resilient bumpers disposed in position to cushion both the down stroke and the up stroke of said staple forming means.

7. A structure as specified in claim 5, said staple forming and driving means comprising a staple former and a staple driver connected together for relative movement between them, and said cushioning means comprising bumpers of resilient material disposed in position to cushion both the down stroke and the up stroke of said staple forming means, and to cushion the relative motion between the staple former and the staple driver.

8. In stapling mechanism, the combination of reciprocating staple forming and driving means, a pitman having one end pivoted on said staple forming and driving means, and means for actuating said pitman, there being means associated with the pivoted end of the pitman to take more or less of the thrust off from the pivot during the driving of each staple into the work.

9. A structure as specified in claim 8, said pitman being formed to embrace the staple forming and driving means, and said associated means being disposed between the pitman and the end of said staple forming and driving means, whereby said associated means is disposed between the pitman and said pivot, with portions of said staple forming and driving means interposed between the pivot and said associated means.

10. A structure as specified in claim 8, said staple forming and driving means comprising a staple former and a staple driver connected together for relative motion between them, said pivot being fixed in the staple driver, permitting said associated means to sustain the thrust instead of the pivot during the severing, forming and insertion of each staple.

11. In stapling mechanism, the combination of a reciprocating staple former and a staple driver, said driver having a separately formed staple engaging portion, and a shoulder piece engaging said staple engaging portion, fastened to the staple driver, said shoulder piece having ribs engaging in grooves in the staple driver, said shoulder piece being thus anchored to the staple driver to receive the thrust of said staple engaging portion.

12. A structure as specified in claim 11, said staple engaging portion being removable and renewable, and said shoulder piece tending to prevent distortion of the engagement between the driver and said staple engaging portion.

13. A structure as specified in claim 11, said shoulder piece having rivets extending through the driver, and the driver having a cam piece fastened in place by said rivets, together with a loop bar for engagement with said cam piece, said cam piece being keyed to the driver, thereby relieving the strain on the rivets.

14. In stapling mechanism, the combination of a reciprocating staple former and a staple driver, said staple former having a cutting edge that engages the staple wire after the staple former engages said wire, the staple former being shaped so that the wire is first bent slightly and then cut off in practically a straight length, before being bent into staple form, and means co-operating with said edge to cut the wire practically at the point where it is first bent.

15. In stapling mechanism, the combination of a reciprocating staple former and a staple driver, the staple former having a cutting edge, a feed tube rectangular in cross section and provided with a cutting edge for co-operation with said cutting edge of the staple former, a threaded shank for the outer end of said feed tube, a support having a recess for said feed tube, a nut on said shank for the adjustment of said feed tube endwise, a clamping block having a middle portion adapted to extend into said recess to engage the side of the feed tube, and means to secure said clamping block in place on said support, whereby loosening of said clamping block will permit endwise adjustment of said feed tube.

16. In stapling machinery, a staple driver, a staple former, a cam on the staple driver, a loop bar actuated into and out of operative position by said cam, rivets extending through the staple driver and said cam, with countersunk heads, and bushings on said rivets, in the plane of the joint between the cam and the staple driver, whereby the shearing strain is on said bushings, instead of on said rivets.

17. In stapling machinery, a staple driver, a staple former, a pitman, a wrist pin connecting the pitman with the staple driver, a staple former, and a latch pivoted on said wrist pin to engage and disengage the staple former.

18. A structure as specified in claim 17, said latch being recessed around said wrist pin, and a flat coil spring in said recess, with one end of said spring anchored in said wrist pin, and the other end of the spring anchored in the latch, whereby said spring is operative to control said latch in the engagement and disengagement thereof with said staple former.

19. A structure as specified in claim 17, said wrist pin having its outer end provided with a guide, a rod having one end fixed on the staple former, extending through said guide, a nut on the other end of said rod, and a rubber cushion interposed between said nut and said guide.

20. A structure as specified in claim 17, said wrist pin having its outer end provided with a guide, a rod having one end fixed on the staple former, extending through said guide, a nut on the other end of said rod, and a rubber cushion interposed between said nut and said guide, together with a stationary bumper for engaging said nut, and a stationary bumper for engaging the point of fixture of the rod on the staple former.

21. In stapling mechanism, the combination of reciprocating staple forming and driving means, actuating means operative to reciprocate said staple forming and driving means, and resilient cushioning means to cushion the strokes of said staple forming means, said cushioning means comprising resilient bumpers disposed in position to cushion both the down stroke and the up stroke of said staple forming means.

22. In stapling mechanism, the combination of reciprocating staple forming and driving means, actuating means operative to reciprocate said staple forming and driving means, and resilient cushioning means to cushion the strokes of said staple forming means, said staple forming and driving means comprising a staple former and a staple driver connected together for relative movement between them, and said cushioning means comprising bumpers of resilient material disposed in position to cushion both the down stroke and the up stroke of said staple forming means, and to cushion the relative motion between the staple former and the staple driver.

WALTER F. NEWHOUSE.